United States Patent
Jun

(10) Patent No.: US 9,946,103 B2
(45) Date of Patent: Apr. 17, 2018

(54) DISPLAY APPARATUS

(71) Applicant: Samsung Display Co., Ltd., Yongin-Si, Gyeonggi-Do (KR)

(72) Inventor: Chansoo Jun, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 171 days.

(21) Appl. No.: 15/138,328

(22) Filed: Apr. 26, 2016

(65) Prior Publication Data
US 2017/0108733 A1    Apr. 20, 2017

(30) Foreign Application Priority Data

Oct. 15, 2015  (KR) .......................... 10-2015-0144136

(51) Int. Cl.
*G02F 1/1333* (2006.01)
*F21V 8/00* (2006.01)

(52) U.S. Cl.
CPC ....... *G02F 1/133308* (2013.01); *G02B 6/009* (2013.01); *G02F 2001/13332* (2013.01)

(58) Field of Classification Search
CPC ..... G02F 2001/13332; G02F 1/133308; G02B 6/009
See application file for complete search history.

(56) References Cited

U.S. PATENT DOCUMENTS

| 2006/0132407 | A1* | 6/2006 | Isoo | G02F 1/133308 345/89 |
| 2009/0096957 | A1* | 4/2009 | Hiyama | G02B 6/003 349/65 |
| 2009/0290089 | A1* | 11/2009 | Ichioka | G02F 1/133308 349/58 |
| 2013/0182198 | A1* | 7/2013 | Chang | G02F 1/133615 349/58 |

FOREIGN PATENT DOCUMENTS

| EP | 1238886 A2 | 9/2002 |
| KR | 1020040017693 A | 2/2004 |
| KR | 10-1297252 B1 | 8/2013 |

* cited by examiner

*Primary Examiner* — Mary Ellen Bowman
(74) *Attorney, Agent, or Firm* — Cantor Colburn LLP

(57) ABSTRACT

A display apparatus includes a display panel and a top chassis. The top chassis includes a first cover portion disposed above a top surface of the display panel and a second cover portion which is bent and extended from the first cover portion. The first cover portion defines a first region thereof overlapping the top surface of the display panel, a second region thereof disposed around the first region and a surface thereof which is disposed in the first and second regions and faces the top surface of the display panel. A surface roughness of the surface in the first region is greater than that of the surface in the second region.

18 Claims, 9 Drawing Sheets

DISPLAY APPARATUS

This application claims priority to Korean Patent Application No. 10-2015-0144136, filed on Oct. 15, 2015, and all the benefits accruing therefrom under 35 U.S.C. § 119, the contents of which in their entirety are hereby incorporated by reference.

BACKGROUND (1) Field

The invention relates to a display apparatus, and more particularly, to a display apparatus including a top chassis.

(2) Description of the Related Art

Display apparatuses include a liquid crystal display device ("LCD"), a plasma display device ("PDP"), a field emission display device ("FED"), a light emitting diode display device and an organic light emitting diode display device.

The display apparatuses have advantages including advances in mass production technology, ease of driving means, relatively low power consumption, relatively slim thickness and realization of high image quality and wide screen to firmly secure a market position and expand application fields thereof.

SUMMARY

One or more exemplary embodiment provides a display apparatus having improved display quality.

An exemplary embodiment of the invention provides a display apparatus including: a display panel divided into a display area configured to display an image and a non-display area which is disposed around the display area; and a top chassis which covers the non-display area of the display panel.

The top chassis may include: a first cover portion disposed above a top surface of the display panel; and a second cover portion which is bent and extended from the first cover portion.

The first cover portion defines a first region thereof overlapping the top surface of the display panel, a second region thereof disposed around the first region, and a surface thereof which is disposed in the first and second regions and faces the top surface of the display panel. A surface roughness of the surface in the first region is greater than that of the surface in the second region.

A maximum distance between the first cover portion and the top surface of the display panel may define a first distance.

The first cover portion may further define a protruding portion in the first region, and the protruding portion may be protruded from the surface of the first cover portion in the first region. The protruding portion may protrude by a second distance from the surface of the first cover portion in the first region and toward the top surface of the display panel, the second distance being less than the first distance.

The first cover portion may further define a recessed portion in the first region and connected to the protruding portion in the first region, the recessed portion recessed from a distal end of the protruding portion in the first region. The protruding portion and the recessed portion may be alternately arranged with each other in the first region.

The first cover portion may extend from the second cover portion to overlap an edge of the top surface of the display panel, the edge lengthwise extended in a first direction. The protruding portion may lengthwise extend in the first direction. The recessed portion may lengthwise extend in the first direction.

In an exemplary embodiment, each of the protruding portion and the recessed portion extended in the first direction may have a semicircular shape in a cross-section taken parallel to a plane defined by a second direction crossing the first direction and a third direction which is perpendicular to the first and second directions.

In an exemplary embodiment, each of the protruding portion and the recessed portion extended may extend in the first direction and have a polygonal shape in a cross-section taken parallel to a plane defined by a second direction crossing the first direction and a third direction which is perpendicular to the first direction and the second direction.

In an exemplary embodiment, each of the protruding portion and the recessed portion may be a discrete member provided in plurality in the first region. The protruding portions and the recessed portions may be alternately arranged in both first and second directions defining a plane in which the surface of the first cover portion is disposed.

Each of the recessed portions may define a shape recessed from the surface of the first cover portion in the first region, the shape defining a depth of the recessed portion, and the depth defining a third distance equal to the second distance. Each of the protruding portion and the recessed portion may have a hemispherical shape.

The first cover portion may further define a flat portion in the first region, the flat portion coplanar with the surface of the first cover portion in the second region. The flat portion may be disposed between the protruding portion and the recessed portion in the first region to connect the protruding portion to the recessed portion.

In an exemplary embodiment, the protruding portion may define a discrete member having at least one of a polypyramid shape, a cone shape, a polyprism shape and a cylindrical shape.

In an exemplary embodiment, the display apparatus may further include a backlight unit disposed under the display panel. The backlight unit may include: a bottom chassis disposed under the display panel; a mold frame disposed between the display panel and the bottom chassis; and a light source unit disposed between the bottom chassis and the mold frame.

The bottom chassis may include: a bottom portion facing the display panel; and a sidewall portion which is bent and extended from the bottom portion, the sidewall portion facing the second cover portion.

The mold frame may include: a first frame portion disposed between the second cover portion and the sidewall portion; a second frame portion facing the first frame portion with the sidewall portion therebetween; a connecting portion connecting the first frame portion to the second frame portion, the connecting portion being disposed between the sidewall portion and the first cover portion; and a support portion connected to the second frame portion and disposed between the light source unit and the display panel to support the display panel.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
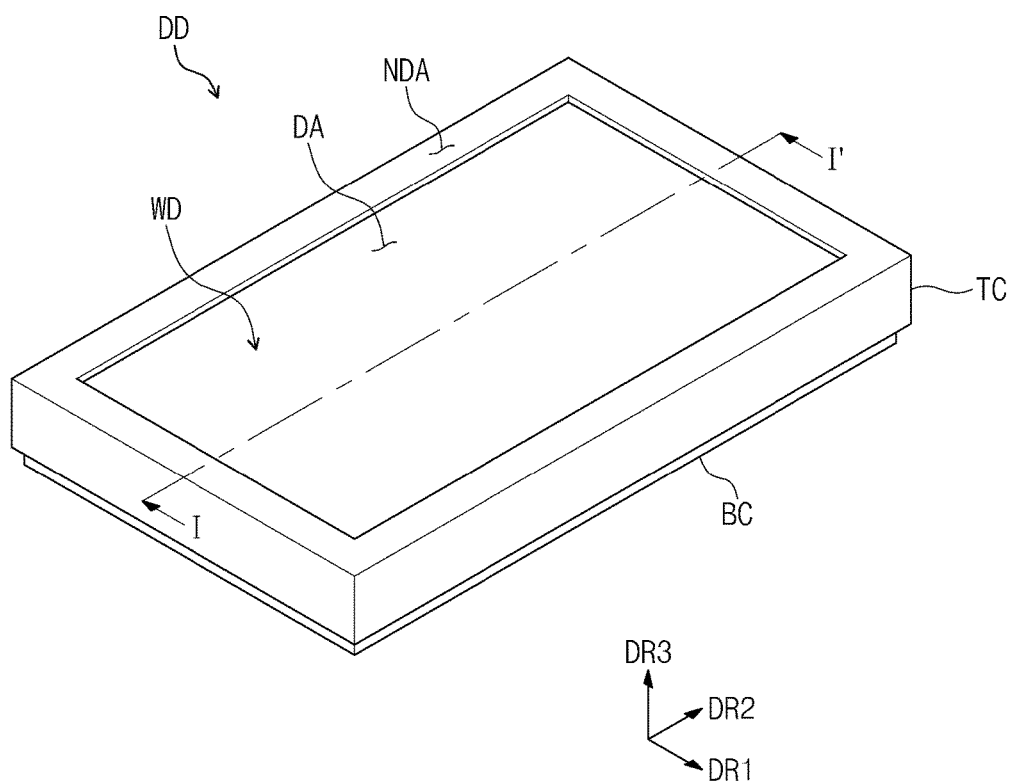
FIG. 1 is a perspective view of an exemplary embodiment of a display apparatus according to the invention.

Exemplary embodiments of the invention will be described below in more detail with reference to the accompanying drawings. The invention may, however, be embodied in different forms and should not be construed as limited to the embodiments set forth herein. It should be understood that the present disclosure covers all the modifications, equivalents, and replacements within the idea and technical scope of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." The meaning of 'include' or 'comprise' specifies a property, a region, a fixed number, a step, a process, an element and/or a component but does not exclude other properties, regions, fixed numbers, steps, processes, elements and/or components.

In the specification, it will be understood that when a layer (or film), a region, or a plate is referred to as being 'on' another layer, region, or plate, it can be directly on the other layer, region, or plate, or intervening layers, regions, or plates may also be present. Similarly, it will be understood that when a layer (or film), a region, or a plate is referred to as being 'under' another layer, region, or plate, it can be directly under the other layer (or film), region, or plate, or intervening layers, regions, or plates may also be present. In contrast, when an element is referred to as being "directly on" or "directly under" another element, there are no intervening elements present.

Like reference numerals refer to like elements throughout. In the drawings, the dimensions and size of each structure are exaggerated, omitted, or schematically illustrated for convenience in description and clarity. It will be understood that although the terms of first and second are used herein to describe various elements, these elements should not be limited by these terms. Terms are only used to distinguish one component from other components. For example, a first element referred to as a first element in one embodiment can be referred to as a second element in another embodiment. The terms of a singular form may include plural forms unless referred to the contrary.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments will be described in detail with reference to the accompanying drawings.

Figure 2:
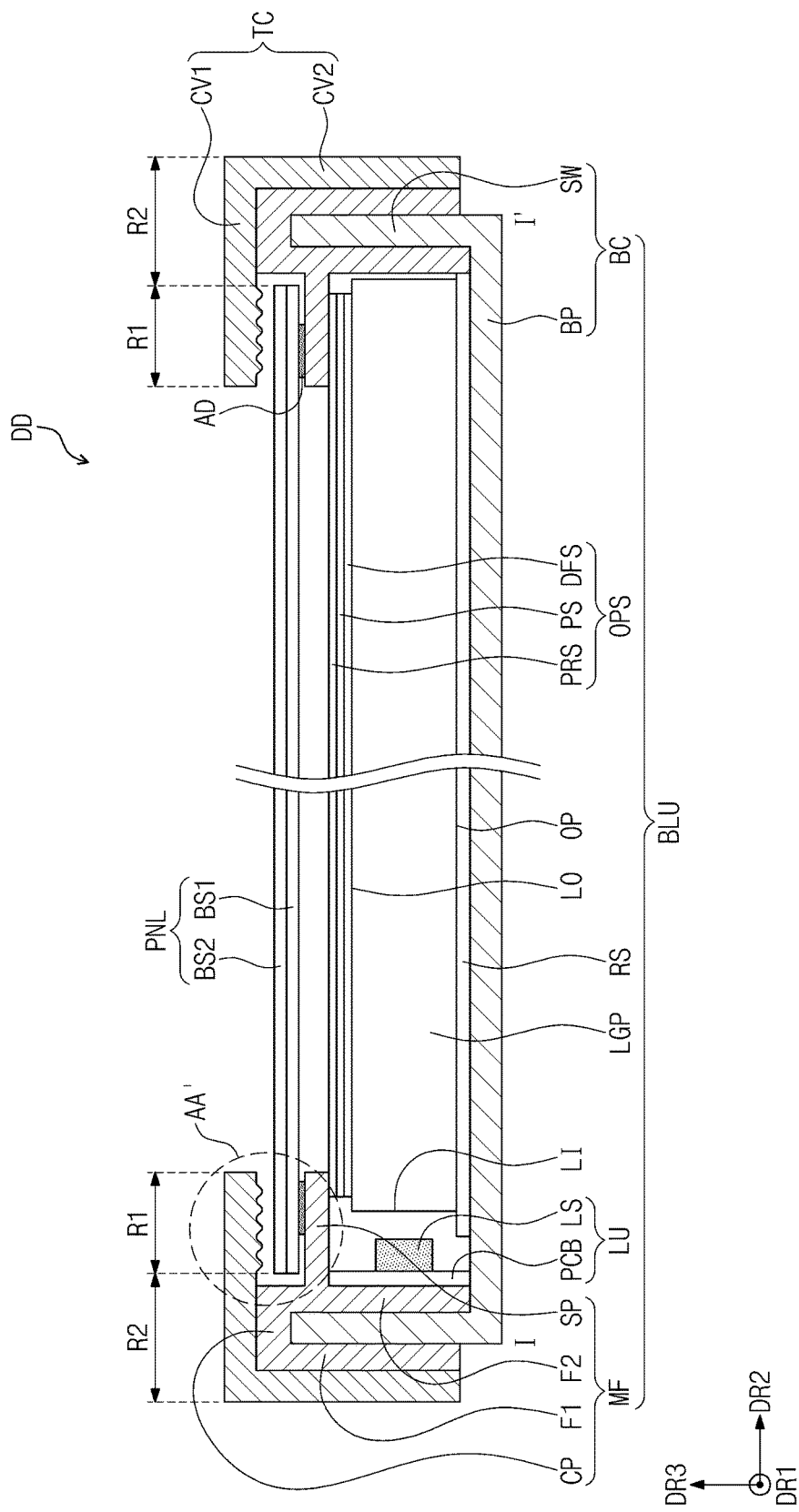
FIG. 2 is a cross-sectional view of the display apparatus taken along line I-I' of FIG. 1.

FIG. 1 is a perspective view of an exemplary embodiment of a display apparatus according to the invention, and FIG. 2 is a cross-sectional view of the display apparatus taken along line I-I' of FIG. 1.

Referring to FIGS. 1 and 2, the display apparatus DD may include a display panel PNL, a top chassis TC and a backlight unit BLU. Here, for convenience of description, a direction in which an image is provided from the display apparatus DD is described as an upward direction, and a direction opposite to the upward direction is described as a downward direction. However, the upward direction or the downward direction, as a relative concept, may be converted into other directions.

The display panel PNL may display an image. Although the display panel PNL is described as a light receiving type display panel, such as a liquid crystal display panel, an electrowetting display panel, an electrophoretic display panel and a microelectromechanical system display panel, the invention is not limited thereto. In an exemplary embodiment, for example, the display panel PNL of the display apparatus DD may be an organic light emitting display panel or a plasma display panel. Here, since the organic electric field light emitting display panel and the plasma display panel may self-generate light to display an image, the backlight unit BLU may be omitted from the display apparatus DD. Hereinafter, the liquid crystal display panel will be described as an example of the display panel PNL.

The display panel PNL may have a rectangular plate shape having two pairs of sides that are parallel to each other. According to an exemplary embodiment of the invention, the display panel PNL may have a rectangular shape having a pair of relatively short sides lengthwise extending in a first direction DR1 and a pair of relatively long sides lengthwise extending in a second direction DR2 crossing the first direction DR1.

The display panel PNL includes a first substrate BS1, a second substrate BS2 facing the first substrate BS1, and a liquid crystal layer (not shown) disposed between the first and second substrates BS1 and BS2. In a top plan view, the display panel PNL includes a display area DA for displaying an image, and a non-display area NDA, in which an image is not displayed, surrounding the display area DA. The non-display area NDA is covered by the top chassis TC.

According to an exemplary embodiment of the invention, the first base substrate BS1 may include a plurality of pixel electrodes (not shown) and a plurality of thin film transistors (not shown) which is electrically connected to the pixel electrodes in one-to-one correspondence to the pixel electrodes. A thin film transistor may be connected to each of the pixel electrodes respectively corresponding to the thin film transistor to switch a driving signal provided to the each of the pixel electrodes.

The second base substrate BS2 may include a common electrode (not shown) forming an electric field together with the pixel electrodes and the electric field controls an orientation of liquid crystal in the liquid crystal layer. The display panel PNL drives the liquid crystal layer to display an image in the third direction DR3 that is the upward direction crossing the first direction DR1 and the second direction DR2.

Although not shown, the display panel PNL may include a driving chip for providing the driving signal, a tape carrier package on which the driving chip is mounted, and a printed circuit board electrically connected to the display panel PNL through the tape carrier package.

The top chassis TC is disposed above the display panel PNL. The top chassis TC may include or define a first cover portion CV1 disposed above the display panel PNL and a second cover portion CV2 which is bent and extended from the first cover portion CV1 in a direction opposite to the third direction DR3. The first cover portion CV1 may cover an edge of a top surface of the display panel PNL, that is, the non-display area NDA.

The top chassis TC includes or defines a display window WD for exposing the display area DA of the display panel PNL. The top chassis TC may include a material such as plastic, aluminum, stainless steel, or the like. Hereinafter, the top chassis TC will be described in detail.

The backlight unit BLU, which is for generating and providing light to the display panel PNL, may be disposed under the display panel PNL. The backlight unit BLU may include a bottom chassis BC, a light guide plate LGP, a light source unit LU, an optical sheet OPS and a mold frame MF.

The bottom chassis BC may be disposed under the display panel PNL. The bottom chassis BC may include or define a bottom portion BP facing a rear surface of the display panel PNL and a sidewall portion SW which is bent and extending from the bottom portion BP.

The bottom portion BP may be extended parallel to a plane defined by the first direction DR1 and the second direction DR2. In the top plan view of the plane defined by the first direction DR1 and the second direction DR2, the bottom portion BP may have a rectangular shape corresponding to a shape of the display panel PNL. The sidewall portion SW may extend from the bottom portion BP in the third direction DR3 to define a predetermined inner space with the bottom portion BP. The bottom portion BP extended parallel to the plane defined by the first direction DR1 and the second direction DR2 may extend bent in the third direction to define the sidewall portion SW. The sidewall portion SW may be disposed to face the second cover portion CV2. The sidewall portion SW may overlap the first cover portion CV1 in the top plan view.

The light guide plate LGP, which is for guiding light incident to the light guide plate LGP to the display panel PNL, may be disposed between the display panel PNL and the bottom portion BP. The light guide plate LGP may include or be formed of transparent polymer resin such as polycarbonate or polymethyl methacrylate.

The light guide plate LGP may define or be a divided into a light incident surface LI, a light emission surface LO and an opposing surface OP. Side surfaces of the light guide plate LGP connect the light emission surface LO and the opposing surface OP to each other.

Light outputted from the light source unit LU is incident into the light guide plate LGP through the light incident surface LI. When the light source unit LU is disposed to face at least one of the side surfaces connecting two widest surfaces of the light guide plate LGP, at least one of the side surfaces may be defined as the light incident surface LI.

The light emission surface LO may be one of the two widest surfaces of the light guide plate LGP. The light emission surface LO may be disposed a plane facing a rear surface of the display panel PNL. Light incident to the light guide plate LGP through the light incident surface LI may be outputted toward the display panel PNL through the light emission surface LO in the third direction DR3.

The opposing surface OP, which is the other of the two widest surfaces of the light guide plate LGP, faces the light emission surface LO. The light incident to the light incident surface LI may be reflected between the light emission surface LO and the opposing surface OP to move through an inner area of the light guide plate LGP.

The light source unit LU for generating and providing light is disposed to face the light incident surface LI. The light source unit LU may include a light source LS and a printed circuit board PCB.

The light source LS may be mounted on a top surface of the printed circuit board PCB. Light outputted from the light source LS is incident to the light guide plate LGP. Although the light source LS may include a point light source, the invention is not limited thereto. In an exemplary embodiment, the light source LS may be a line light source or a surface light source. According to an exemplary embodiment of the invention, the light source LS including a light emitting diode ("LED") as the point light source is described as an example. The light source LS may be provided with one LED or a plurality of LED groups.

A wiring (not shown) for providing a power to the light source LS to control the light source unit LU is disposed such as by printing on the printed circuit board PCB. The printed circuit board PCB may include a light source control unit (not shown) connected to the light source LS. The light source control unit (not shown) may analyze an image displayed on the display panel PNL to output a local dimming signal and control luminance of the light source LS in response to the local dimming signal. Although the light source control unit (not shown) is mounted on a separate printed circuit board, the invention is not limited thereto.

The optical sheet OPS may be provided between the display panel PNL and the light guide plate LGP. The optical sheet OPS serves to control light emitted from the light source LS. The optical sheet OPS may collectively include individual sheets such as a diffusion sheet DFS, a prism sheet PS and a protection sheet PRS, which are stacked such as being laminated on the light guide plate LGP.

The diffusion sheet DFS diffuses the light from the light guide plate LGP. The prism sheet PS serves to collect the light diffused by the diffusion sheet DFS in a direction perpendicular to a plane of the display panel PNL. Most of the light passing through the prism sheet PS is vertically incident to the display panel PNL. The protection sheet PRS may be disposed on the prism sheet PS. The protection sheet PRS protects the prism sheet PS from external shock.

Although, according to the illustrated exemplary embodiment, the optical sheet OPS includes one diffusion sheet DFS, one prism sheet PS and one protection sheet PRS, the invention is not limited thereto. In an exemplary embodiment, for example, at least one of the diffusion sheet DFS, the prism sheet PS and the protection sheet PRS may be provided in plurality within the optical sheet OPS, or one of the diffusion sheet DFS, the prism sheet PSM and the protective sheet PRS may be omitted. Positions of the diffusion sheet DFS, the prism sheet PS and the protection sheet PRS within the optical sheet OPS may be variously changed.

The mold frame MF may be disposed under the display panel PNL to support the display panel PNL. The mold frame MF may fix positions of the optical sheet OPS, the light source unit LU, and the like within the backlight unit BLU and/or the display apparatus DD. The mold frame MF may be disposed between the top chassis TC and the bottom chassis BC and assembled with the top chassis TC and the bottom chassis BC.

The mold frame MF may define or be divided into a first frame portion F1, a second frame portion F2, a connecting portion CP and a support portion SP.

The first frame portion F1 may be disposed between the second cover portion CV2 of the top chassis TC and the sidewall portion SW of the bottom chassis BC. The first frame portion F1 may be parallel to the second cover portion CV2 and the sidewall portion SW.

The second frame portion F2 may be spaced apart from the first frame portion F1 to define a gap therebetween. The second frame portion F2 may face the first frame portion F1 with the sidewall portion SW of the bottom chassis BC therebetween. The second frame portion F2 may be disposed on the bottom portion BP of the bottom chassis BC.

The connecting portion CP may connect the first frame portion F1 to the second frame portion F2 and be disposed on a distal end of the sidewall portion SW of the bottom chassis BC. The connecting portion CP may be disposed between the sidewall portion SW of the bottom chassis BC and the first cover portion CV1 of the top chassis TC.

The support portion SP may extend from or be connected to the second frame portion F2 and be disposed between the display panel PNL and the optical sheet OPS. The support portion SP may overlap the non-display area NDA of the display panel PNL. The support portion SP may support the display panel PNL thereon and fix a position of the optical sheet OPS within the backlight unit BLU and/or the display apparatus DD.

As the sidewall portion SW of the bottom chassis BC is disposed between the first frame portion F1, the second frame portion F2 and the connecting portion CP, the mold frame MF and the bottom chassis BC may be easily assembled with each other. Although not shown, the mold frame MF may further include a hook that is coupled to the sidewall portion SW of the bottom chassis BC. Here, a groove corresponding to the hook may be provided to the sidewall portion SW.

An exemplary embodiment of the display apparatus DD according to the invention may further include a fixing member such as an adhesive member AD disposed between the display panel PNL and the support portion SP of the mold frame MF. The adhesive member AD may fix the display panel PNL to the support portion SP. Also, the adhesive member AD may adsorb external shock to the display panel PNL to decrease damage to the display panel PNL.

The backlight unit BLU of the display apparatus DD may further include a reflection sheet RS disposed between the light guide plate LGP and the bottom portion BP of the bottom chassis BC. The reflection sheet RS may include a light reflecting material such as polyethylene terephthalate ("PET") or aluminum (Al). The reflection sheet RS may reflect light that is not emitted from the light emission surface LO of the light guide plate LGP and leaked to the reflection sheet RS through the opposing surface OP of the light guide plate LGP to allow the reflected light to be re-incident into the light guide plate LGP. As the reflection sheet RS is provided, loss of light provided to the display panel PNL may decrease.

Figure 3:
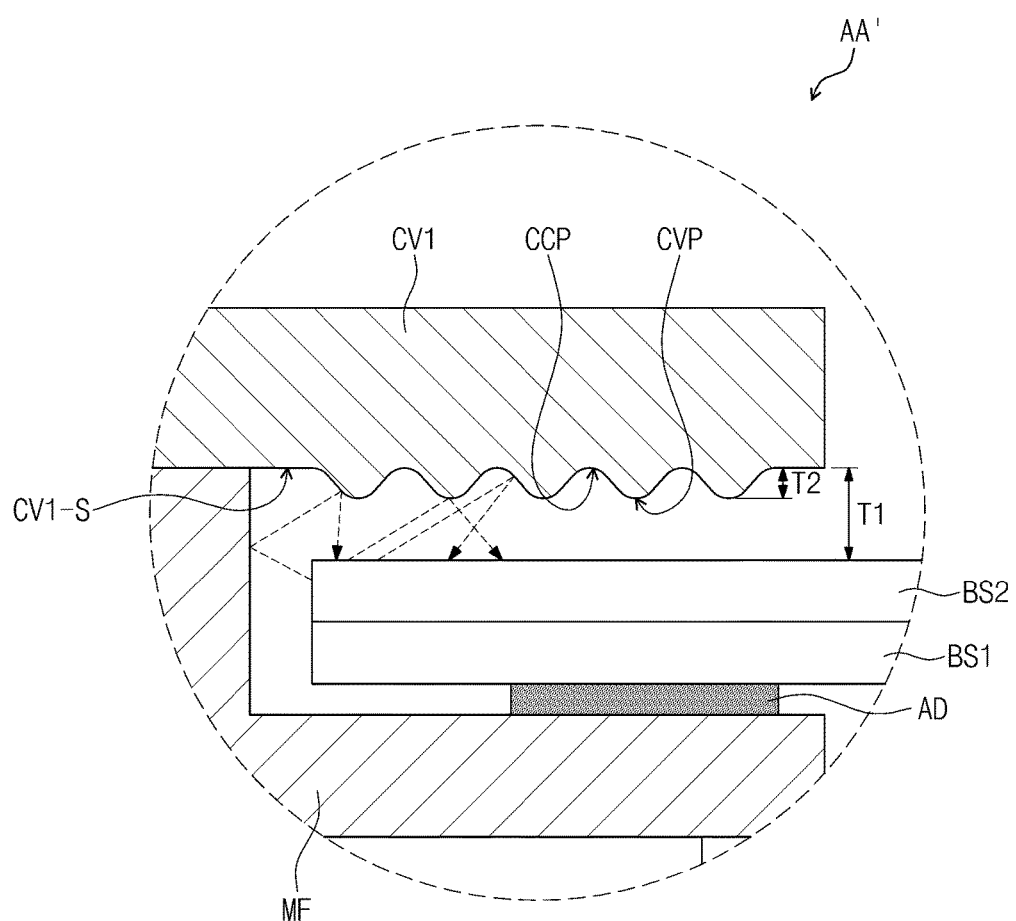
FIG. 3 is an enlarged view of region AA' of FIG. 2.
Figure 4:
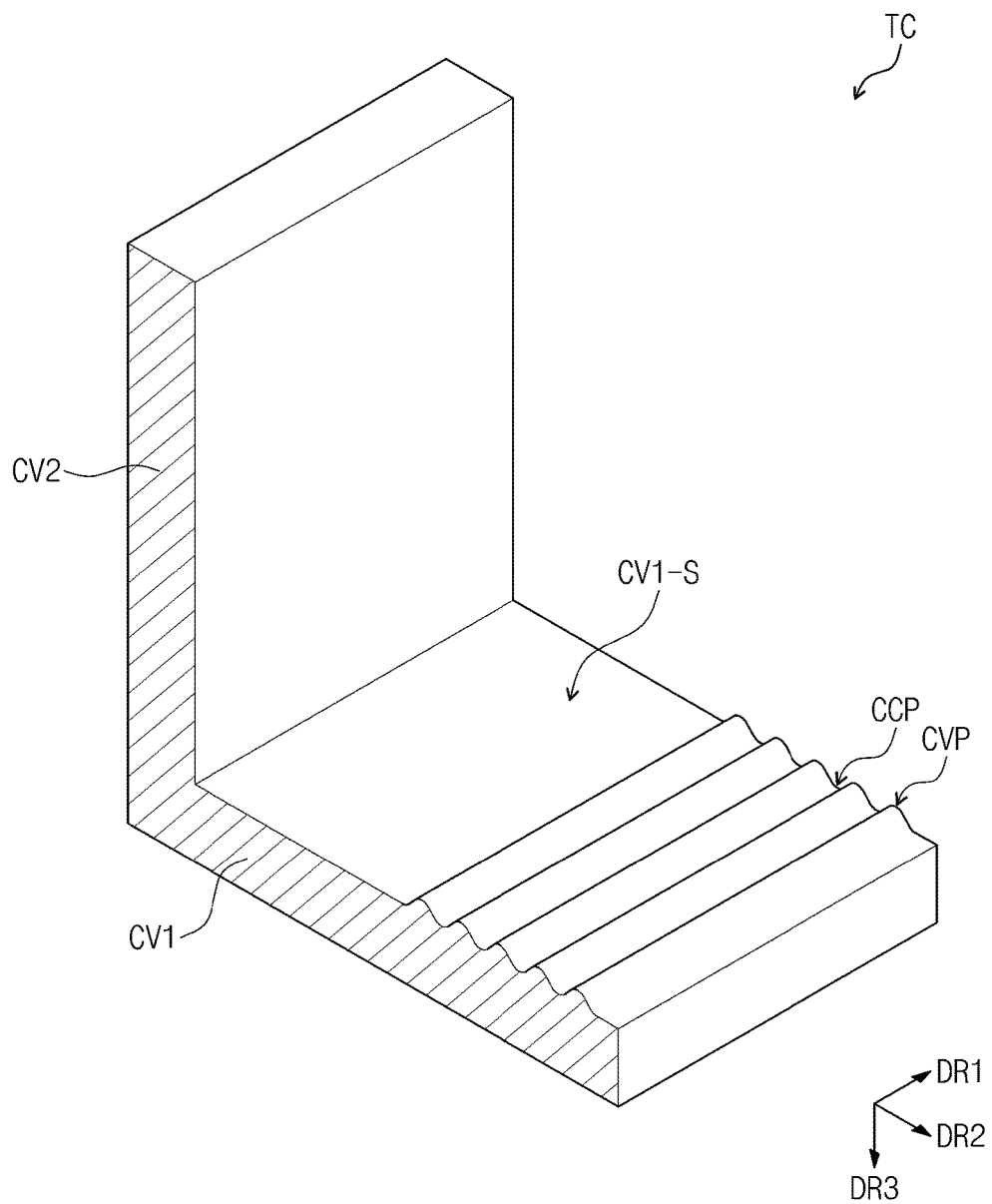
FIG. 4 is a schematic perspective view of an exemplary embodiment of a top chassis of a display apparatus according to the invention.

FIG. 3 is an enlarged view of portion AA' of FIG. 2 and FIG. 4 is a schematic perspective view of an exemplary embodiment of a top chassis of a display apparatus according to the invention. Hereinafter, the top chassis TC of the display apparatus DD in FIG. 1 according to the invention will be described with reference to the drawings.

Hereinafter, referring to FIGS. 2 to 4, the first cover portion CV1 of the top chassis TC may be spaced a first distance T1 from the top surface of the display panel PNL in the third direction DR3. The first distance T1 may be a maximum distance of the first cover portion CV1 from the top surface of the display panel PNL. Although the first distance T1 may be about 0.3 millimeter (mm) to about 0.4 mm, the invention is not limited thereto. In an exemplary embodiment, for example, the first distance T1 may be equal to or less than about 0.3 mm, or equal to or greater than about 0.4 mm.

The first cover portion CV1 may define or be divided into a first region R1 overlapping the top surface of the display panel PNL and a second region R2 that is a remainder of the first cover portion CV1 except for the first region R1. A surface CV1-S extends to be disposed in both the first and second regions R1 and R2 of the first cover portion CV1. A first portion of the surface CV1-S in the first region R1 faces the top surface of the display panel PNL. The surface CV1-S in the first region R1 may define or include surface roughness greater than that of a second portion of the surface CV1-S of the first cover portion CV1 in the second region R2.

According to an exemplary embodiment of the invention, light leaked from one side of the display panel PNL is irregularly reflected or refracted at or by the surface CV1-S of the first cover portion CV1 in the first region R1 to be incident into the display panel PNL and/or the backlight unit BLU. Accordingly, a phenomenon in which light is leaked between the display panel PNL and the top chassis TC is reduced to improve display quality of the display apparatus DD.

The surface CV1-S in the first region R1 and the second region R2 may be extended in the plane defined by the first and second directions DR1 and DR2. With reference to the plane, a protruding portion CVP may be provided at the surface CV1-S of the first cover portion CV1 in the first region R1. The protruding portion CVP may protrude by a second distance T2 less than the first distance T1 from the plane toward the top surface of the display panel PNL. The second distance T2 may be a maximum distance taken from the plane to a distal end of the protruding portion CVP.

According to an exemplary embodiment of the invention, a recessed portion CCP connected to the protruding portion CVP may be further provided at the surface CV1-S of the first cover portion CV1 in the first region R1. The recessed portion CCP may be a portion recessed relative to the distal end of the protruding portion CVP.

The protruding portion CVP and/or the recessed portion CCP may be provided in plural within the first region R1. The protruding portion CVP and/or the recessed portion CCP may be defined by a pair of adjacent recessed portions CCP and a pair of adjacent protruding portions CVP, respectively. The protruding portion CVP and the recessed portion CCP may be alternately arranged with respect to each other.

Although not shown, according to an exemplary embodiment of the invention concept, a flat portion (not shown) such as disposed between the protruding portion CVP and the recessed portion CCP may be further provided at the surface CV1-S of the first cover portion CV1 in the first region R1. The flat portion of the surface CV1-S of the first cover portion CV1 in the first region R1 may be substantially coplanar with the surface CV1-S of the first cover portion CV1 in the second region R2.

The protruding portion CVP and the recessed portion CCP as light path-changing or light-directing members, with or without a flat portion described above, disposed in the first region R1, may define a surface roughness of the surface CV1-S of the first cover portion CV1 in the first region R1 greater than that of the surface CV1-S of the first cover portion CV1 in the second region R2. Accordingly, light leaked from one side of the display panel PNL is irregularly reflected or refracted at or by the surface CV1-S of the first cover portion CV1 in the first region R1 to be incident into the display panel PNL and/or the backlight unit BLU. Accordingly, a phenomenon in which light is leaked between the display panel PNL and the top chassis TC is reduced to improve display quality of the display apparatus DD.

Referring to FIG. 4, the protruding portion CVP may lengthwise extend along an extending direction of one edge of the display panel PNL in the first direction DR1 or the second direction DR2. Here, for example, the top chassis TC corresponding to a short side of the display panel PNL will be described.

The protruding portion CVP and the recessed portion CCP may each lengthwise extend in the first direction DR1. The short side of the display PNL and/or the light source unit LU may lengthwise extend in the first direction DR1. Each of the protruding portion CVP and the recessed portion CCP may be provided in plurality within the first region R1. The protruding portion CVP and the recessed portion CCP may be alternately arranged with respect to each other in the second direction DR2. The protruding portion CVP and the recessed portion CCP, with or without a flat portion described above, disposed in the first region R1, may define an entire of the first region R1, but the invention is not limited thereto. The first region R1 may include only protruding portions, with or without the flat portion, as shown in FIG. 4, but the invention is not limited thereto.

Although each of the protruding portion CVP and the recessed portion CCP has a semicircular shape in cross-section viewed parallel to a plane that is defined by the second and third directions DR2 and DR3 respectively crossing extending directions of the protruding portion CVP and the recessed portion CCP, the invention is not limited thereto. In an exemplary embodiment, for example, the protruding portion CVP and the recessed portion CCP may have various shapes such as a polygon in the cross-section thereof. Hereinafter, with reference to the drawings, the cross-sectional shape of the protruding portion CVP and the recessed portion CCP, which is different from the shape in FIG. 4, will be described.

Figure 5:
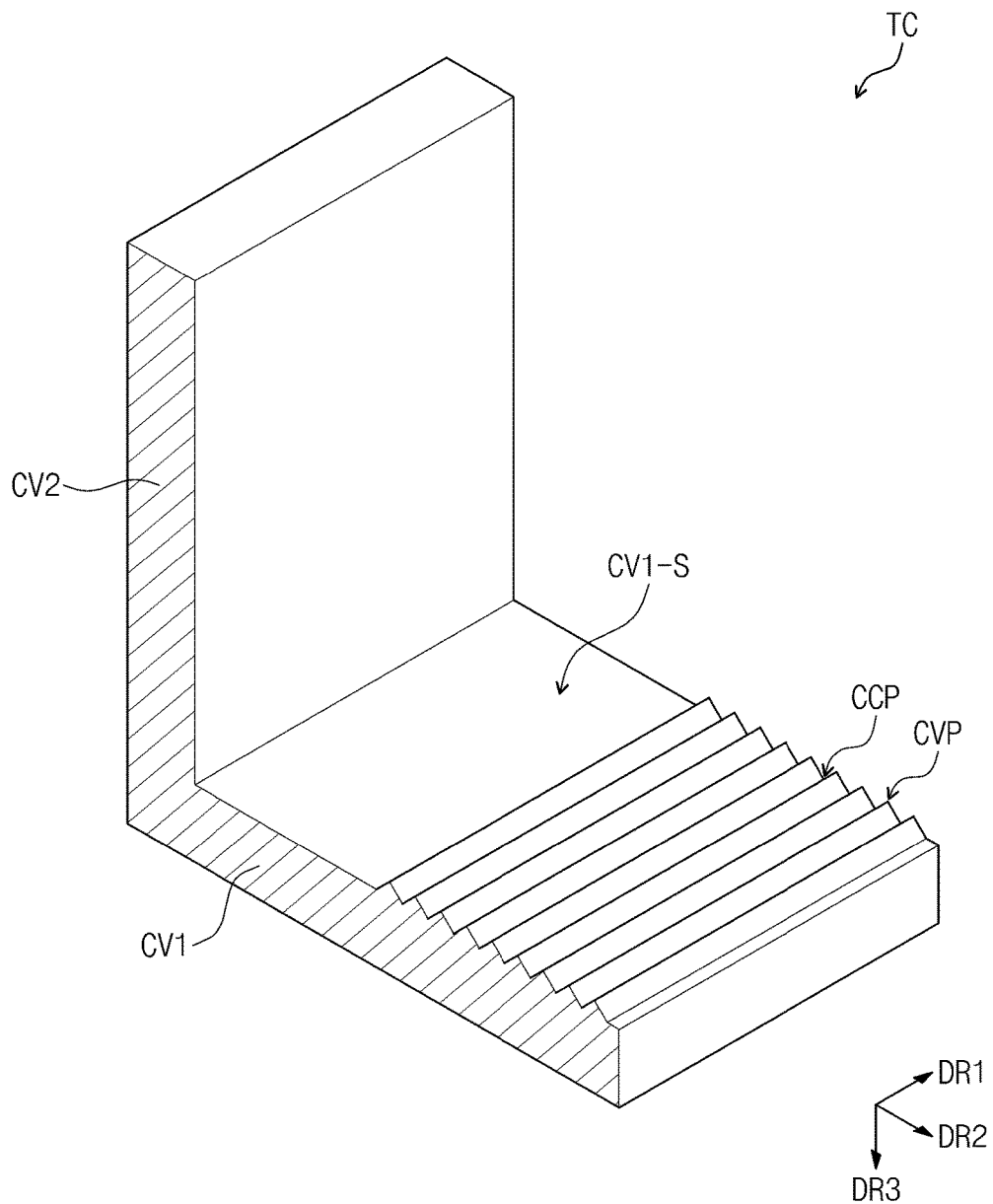
FIGS. 5 and 6 are schematic perspective view of modified exemplary embodiments of a top chassis of a display apparatus according to the invention.
Figure 6:
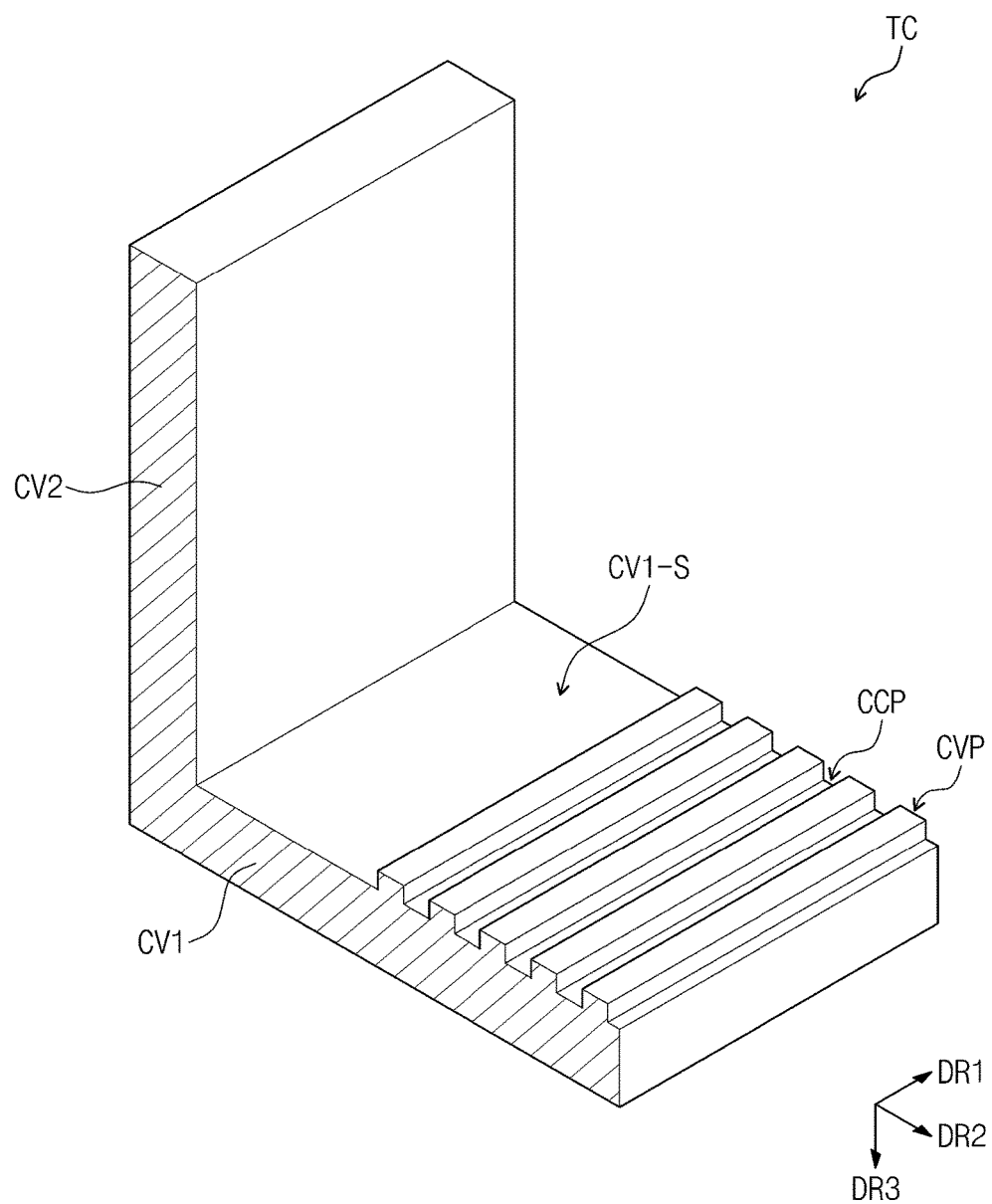

FIGS. 5 and 6 are schematic perspective view of modified exemplary embodiments of a top chassis of a display apparatus according to the invention. Referring to FIG. 5, the protruding portion CVP and the recessed portion CCP may each have a cross-section defining a triangular shape. Referring to FIG. 6, the protruding portion CVP and the recessed portion CCP may each have a cross-section defining a quadrangular shape.

Hereinafter, other exemplary embodiments of the invention will be described with reference to the drawings. For convenience of description, the differences between the following exemplary embodiments and the foregoing exemplary embodiments will be mainly described, and omitted descriptions will be derived from the foregoing exemplary embodiments. Also, reference numerals for above-described elements are given, and overlapped description for the elements will be omitted.

Figure 7:
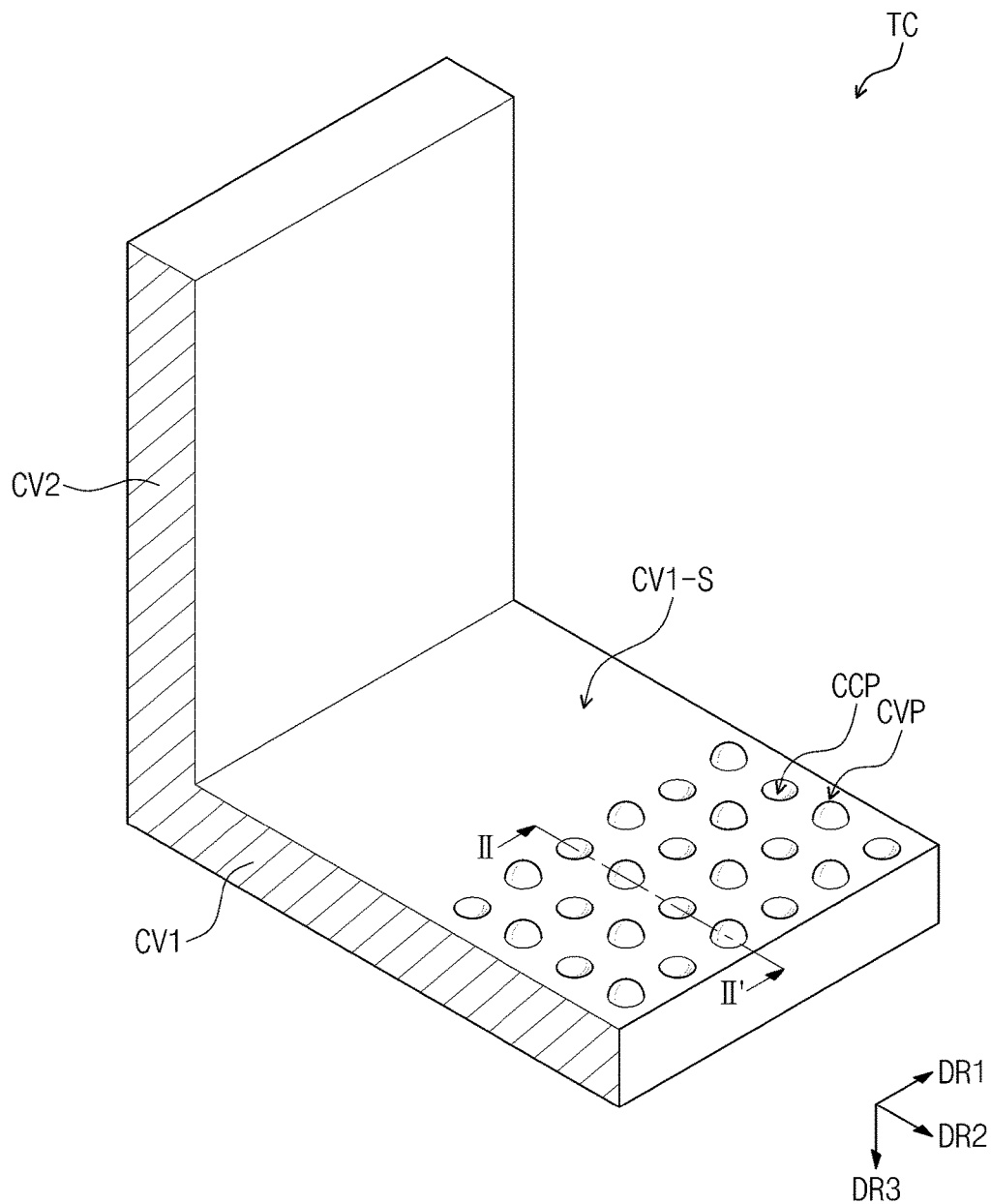
FIG. 7 is a schematic perspective view of another exemplary embodiment of a top chassis of a display apparatus according to the invention.
Figure 8:
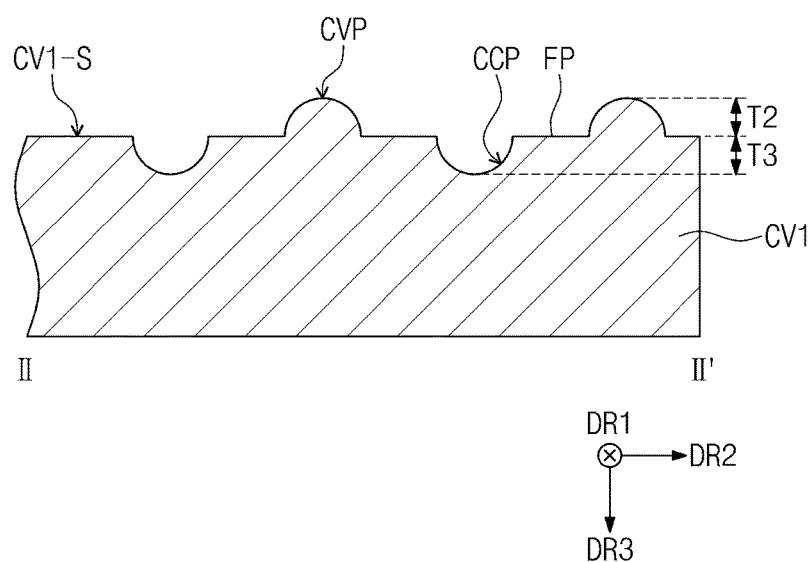
FIG. 8 is a cross-sectional view of the top chassis taken along line II-II' of FIG. 7.

FIG. 7 is a schematic perspective view of another exemplary embodiment of a top chassis of a display apparatus according to the invention, and FIG. 8 is a cross-sectional view of the top chassis taken along line II-II' of FIG. 7.

Referring to FIGS. 7 and 8, a protruding portion CVP and a recessed portion CCP may be discretely provided at the surface CV1-S of the first cover portion CV1 in the first region R1. Each of the protruding portion CVP and the recessed portion CCP may be provided in plurality. The protruding portion CVP and the recessed portion CCP may be alternately arranged in the first direction DR1 and the second direction DR2.

The protruding portion CVP may protrude by a second distance T2 less than the first distance T1 (refer to FIG. 3) from a plane of the surface CV1-S of the first cover portion CV1 and toward the top surface of the display panel PNL. The second distance T2 may be a maximum distance taken from the plane to a distal end of the protruding portion CVP. The recessed portion CCP may be a portion recessed relatively to the surface CV1-S. The recessed portion CCP may have a shape defined by a portion of the first cover portion CV1 which is removed from the surface CV1-S of the first cover portion CV1. The recessed portion CCP may have a depth of a third distance T3 that is equal to the second distance T2. The third distance T3 may be a maximum distance taken from the plane to a bottom of the recessed portion CCP. Each of the protruding portion CVP and the recessed portion CCP may have a hemispherical shape.

A flat portion FP connecting the protruding portion CVP to the recessed portion CCP may be further provided between the discrete protruding portion CVP and the discrete recessed portion CCP adjacent to each other along the surface CV1-S of the first cover portion CV1 in the first region R1. The flat portion FP may be substantially a flat surface which is coplanar with the surface CV1-S of the first cover portion CV1. The flat surface and the discrete protruding and recessed portions may collectively define a whole of the first region R1.

In an exemplary embodiment, discrete protruding and recessed portions that are different from the discrete protruding and recessed portions CVP and CCP described above may be further or alternatively provided in the first region R1.

Figure 9:
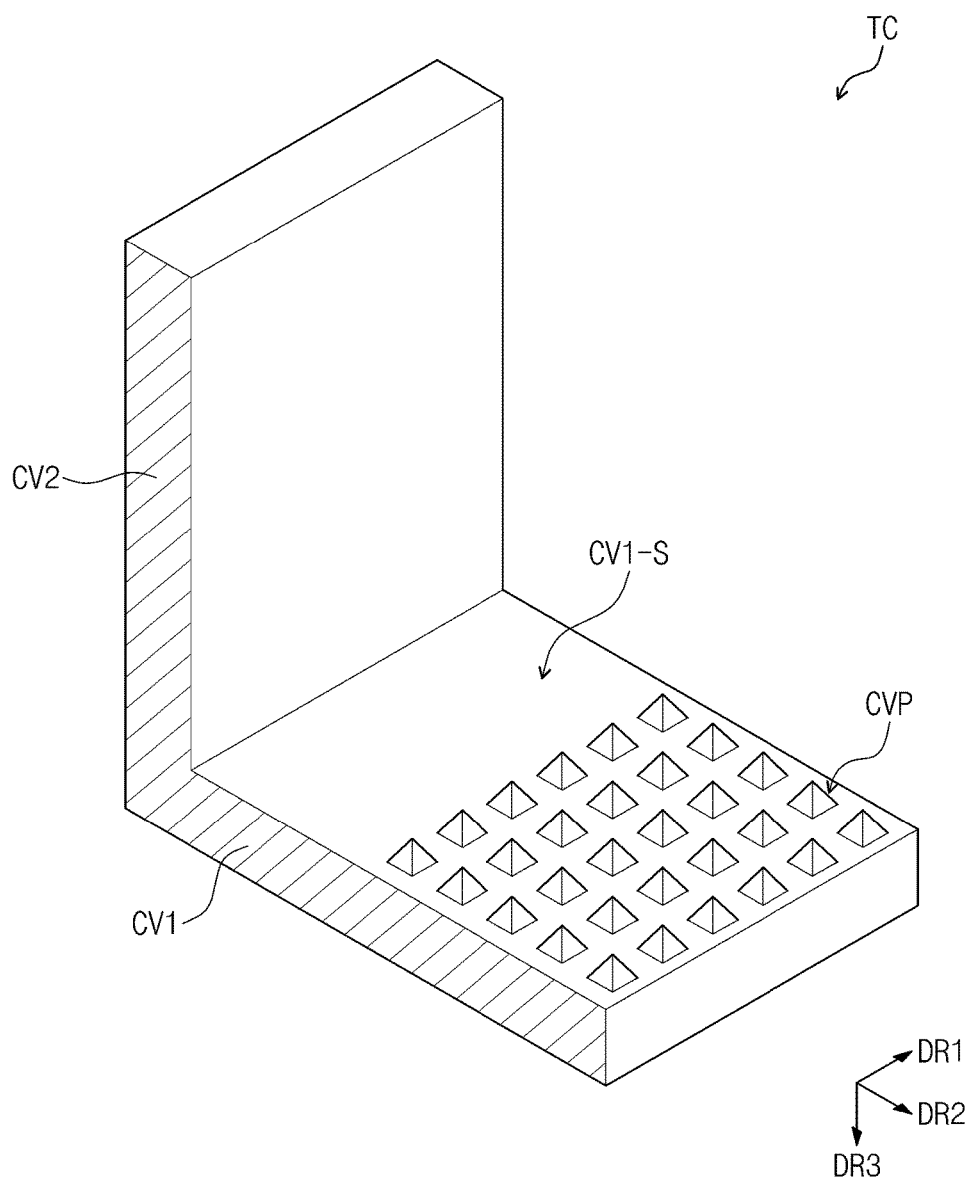
FIG. 9 is a schematic perspective view of still another exemplary embodiment of a top chassis of a display apparatus according to the invention.

FIG. 9 is a schematic perspective view of still another exemplary embodiment a top chassis according to the invention.

Referring to FIG. 9, a discrete protruding portion CVP may be provided at the surface CV1-S of the first cover portion CV1 in the first region R1. The protruding portion CVP may be provided in plurality. Although each of the protruding portions CVP is illustrated to have a pyramidal protruding shape, the invention is not limited thereto. In an exemplary embodiment, for example, each of the discrete protruding portions CVP may have various shapes such as a polypyramidal shape, a polyprismal shape, a cone shape and a cylindrical shape. The first region R1 may include only discrete protruding portions with the flat portion therebetween, as shown in FIG. 9, but the invention is not limited thereto.

According to one or more exemplary embodiment of the invention, the display apparatus including the top chassis with the protruding and/or recessed light path-changing or light-directing members may decrease the phenomenon in which the light is leaked between the display panel and the top chassis, to improve the display quality of the display apparatus.

Although exemplary embodiments of the disclosure have been disclosed, various changes and modifications may be made thereto by one skilled in the art without departing from the scope and spirit of the invention as set forth in the appended claims.

Hence, the protective scope of the invention shall be determined by the technical scope of the accompanying claims.

What is claimed is:

1. A display apparatus comprising:
    a display panel divided into a display area configured to display an image with light and a non-display area which is disposed around the display area; and
    a top chassis which covers the non-display area,
    wherein the top chassis comprises:
        a first cover portion disposed above a top surface of the display panel; and
        a second cover portion bent and extended from the first cover portion,
        wherein
        the first cover portion defines:
            a first region thereof overlapping the top surface of the display panel,
            a second region thereof disposed around the first region, and
            a surface thereof which is disposed in the first and second regions and faces the top surface of the display panel, and
        a surface roughness of the surface in the first region is greater than that of the surface in the second region.

2. The display apparatus of claim 1, wherein a maximum distance between the first cover portion of the top chassis and the top surface of the display panel defines a first distance.

3. The display apparatus of claim 2, wherein
    the first cover portion of the top chassis further defines a protruding portion in the first region, the protruding portion protruded from the surface of the first cover portion in the first region, and
    the protruding portion protrudes a second distance from the surface of the first cover portion in the first region and toward the top surface of the display panel, the second distance being less than the first distance.

4. The display apparatus of claim 3, wherein the first cover portion of the top chassis further defines a recessed portion in the first region and connected to the protruding portion in the first region, the recessed portion recessed from a distal end of the protruding portion in the first region.

5. The display apparatus of claim 4, wherein the protruding portion and the recessed portion are alternately arranged with each other in the first region of the first cover portion of the top chassis.

6. The display apparatus of claim 5, wherein
    the first cover portion extends from the second cover portion to overlap an edge of the top surface of the display panel, the edge lengthwise extended in a first direction, and
    the protruding portion defined by the first cover portion lengthwise extends in the first direction.

7. The display apparatus of claim 6, wherein the recessed portion defined by the first cover portion lengthwise extends in the first direction.

8. The display apparatus of claim 7, wherein each of the protruding portion and the recessed portion lengthwise extended in the first direction has a semicircular shape in a cross-section taken parallel to a plane defined by a second direction crossing the first direction and a third direction which is perpendicular to the first and second directions.

9. The display apparatus of claim 7, wherein each of the protruding portion and the recessed portion lengthwise extended in the first direction has a polygonal shape in a cross-section taken parallel to a plane defined by a second direction crossing the first direction and a third direction which is perpendicular to the first direction and the second direction.

10. The display apparatus of claim 5, wherein each of the protruding portion and the recessed portion defined by the first cover portion is a discrete member provided in plurality in the first region.

11. The display apparatus of claim 10, wherein
    the surface of the first cover portion is disposed in a plane defined by first and second directions crossing each other, and
    the protruding portions and the recessed portions are alternately arranged in both the first and second directions defining the plane in which the surface of the first cover portion is disposed.

12. The display apparatus of claim 11, wherein each of the recessed portions defines a shape recessed from the surface of the first cover portion in the first region, the shape defines a depth of the recessed portion, and the depth defines a third distance which is equal to the second distance.

13. The display apparatus of claim 12, wherein each of the protruding portion and the recessed portion has a hemispherical shape.

14. The display apparatus of claim 13, wherein
    the first cover portion further defines a flat portion in the first region, the flat portion coplanar with the surface of the first cover portion in the second region, and
    the flat portion is disposed between the protruding portion and the recessed portion in the first region of the first cover portion to connect the protruding portion to the recessed portion.

15. The display apparatus of claim 3, wherein the protruding portion defines a discrete member having at least one of a polypyramid shape, a cone shape, a polyprism shape and a cylindrical shape.

16. The display apparatus of claim 1, further comprising a backlight unit disposed under the display panel,
    wherein the backlight unit comprises:

a bottom chassis disposed under the display panel;

a mold frame disposed between the display panel and the bottom chassis; and a light source unit which is disposed between the bottom chassis and the mold frame and generates the light.

17. The display apparatus of claim 16, wherein the bottom chassis comprises:

a bottom portion facing the display panel; and a sidewall portion bent and extended from the bottom portion, the sidewall portion facing the second cover portion of the top chassis.

18. The display apparatus of claim 17, wherein the mold frame comprises:

a first frame portion disposed between the second cover portion of the top chassis and the sidewall portion of the bottom chassis;

a second frame portion facing the first frame portion with the sidewall portion of the bottom chassis therebetween;

a connecting portion which connects the first frame portion to the second frame portion, the connecting portion disposed between the sidewall portion of the bottom chassis and the first cover portion of the top chassis; and a support portion which is connected to the second frame portion and disposed between the light source unit and the display panel to support the display panel.

* * * * *